(12) United States Patent
Ishihara et al.

(10) Patent No.: US 11,782,898 B2
(45) Date of Patent: *Oct. 10, 2023

(54) CONTENT DATA HOLDING SYSTEM, STORAGE MEDIUM, CONTENT DATA HOLDING SERVER, AND DATA MANAGEMENT METHOD

(71) Applicants: Nintendo Co., Ltd., Kyoto (JP); The Pokémon Company, Tokyo (JP)

(72) Inventors: Tsunekazu Ishihara, Tokyo (JP); Takanori Sowa, Tokyo (JP); Nobuyuki Ohta, Tokyo (JP); Takahiro Ohnishi, Tokyo (JP); Hiroki Togashi, Tokyo (JP)

(73) Assignees: NINTENDO CO., LTD., Kyoto (JP); THE POKÉMON COMPANY, Tokyo (JP)

( * ) Notice: Subject to any disclaimer, the term of this patent is extended or adjusted under 35 U.S.C. 154(b) by 116 days.

This patent is subject to a terminal disclaimer.

(21) Appl. No.: 17/562,218

(22) Filed: Dec. 27, 2021

(65) Prior Publication Data

US 2022/0121639 A1    Apr. 21, 2022

Related U.S. Application Data

(63) Continuation of application No. 16/671,386, filed on Nov. 1, 2019, now Pat. No. 11,243,931.

(30) Foreign Application Priority Data

May 27, 2019    (JP) .................................. 2019-098573

(51) Int. Cl.
*G06F 16/00*    (2019.01)
*G06F 16/22*    (2019.01)
(Continued)

(52) U.S. Cl.
CPC .......... *G06F 16/2272* (2019.01); *A63F 13/35* (2014.09); *G06F 16/2365* (2019.01); *G06F 16/2379* (2019.01); *G06F 16/252* (2019.01)

(58) Field of Classification Search
CPC ............. G06F 16/2272; G06F 16/2365; G06F 16/2379; G06F 16/252
See application file for complete search history.

(56) References Cited

U.S. PATENT DOCUMENTS

2010/0069158 A1    3/2010   Kim
2012/0331112 A1    12/2012  Chatani
(Continued)

FOREIGN PATENT DOCUMENTS

JP    2003-126554    5/2003

OTHER PUBLICATIONS

Shaikh et al., "Implementation of a Service Platform for Online Games," ACM SIGCOMM'04 Workshops, Aug. 30-Sep. 3, 2004, pp. 106-110. (Year: 2004).*

(Continued)

*Primary Examiner* — Cheryl Lewis
(74) *Attorney, Agent, or Firm* — Nixon & Vanderhye, PC

(57) ABSTRACT

A server includes a content storage medium configured to store content data of content usable in different types of games. The server, upon a transmission request, sends content data to an information-processing device, and retains the sent content data in the content storage medium wherein sending the content data again is prohibited. The server, when the content data is sent from the information-processing device, receives the content data, assigns a new ID to the received content data in case the received content data lacks the ID, and stores the received content data in the content storage medium wherein sending the content data is allowed.

20 Claims, 9 Drawing Sheets

(51) Int. Cl.
  *G06F 16/23*   (2019.01)
  *A63F 13/35*   (2014.01)
  *G06F 16/25*   (2019.01)

(56) References Cited

U.S. PATENT DOCUMENTS

| | | |
|---|---|---|
| 2013/0130794 A1 | 5/2013 | Oshima |
| 2015/0058903 A1 | 2/2015 | Iyengar |
| 2016/0082348 A1 | 3/2016 | Kehoe |
| 2016/0104352 A1 | 4/2016 | Kehoe |
| 2020/0215412 A1 | 7/2020 | Huke |

OTHER PUBLICATIONS

Joselli et al,. "A Content Adaptation Architecture for Games," SBC—Proceedings of SBGames 2012, Computing Track, XI SBGames, Nov. 2-4, 2012, pp. 17-25. (Year: 2012).*

[ONLINE] URL:https://www.pokemon.com/us/pokemon_video_games/pokemon_bank/, 3 pages.

[ONLINE] URL:https://www.pokemon.co.jp/ex/pokemonbank/bank/> and its English counterpart, 2 pages.

Notification of Reasons for Refusal for Application No. 2020-136752 dated Jun. 20, 2023, 1 page.

Pokemon Sun and Moon Official Guidebook dated May 6, 2020, 5 pages.

* cited by examiner

CONTENT DATA HOLDING SYSTEM, STORAGE MEDIUM, CONTENT DATA HOLDING SERVER, AND DATA MANAGEMENT METHOD

CROSS REFERENCE TO RELATED APPLICATIONS

This application is a continuation of U.S. patent application Ser. No. 16/671,386 filed Nov. 1, 2019, which claims benefit of Japanese Patent Application No. 2019-098573, filed on May 27, 2019, now U.S. Pat. No. 11,243,931 each of which are incorporated herein by reference.

FIELD

An embodiment of the present invention relates to a technique for managing content data usable in a game.

BACKGROUND AND SUMMARY

There is known in the art a service for storing content data usable in a game.

A content data holding system according to an embodiment of the present invention comprises: a server; and at least one information-processing device capable of communicating with the server, wherein the server comprises: a content storage medium configured to store content data of content usable in different types of games; and a processor configured to run a management program of the content data, the information-processing device is configured to: store the content data; and perform at least one of transmission and reception of the content data to/from the server, the content storage medium is configured to store, as the content data, at least an ID that uniquely identifies the content, and at least one parameter used when the content is used in the games, the management program causes the processor to execute: upon a transmission request, sending the content data to the information-processing device, and retaining the sent content data in the content storage medium wherein sending the content data again is prohibited; and when the content data is sent from the information-processing device, receiving the content data, with assigning a new ID to the received content data in case the received content data lacks the ID, and storing the received content data in the content storage medium wherein sending the content data is allowed.

DETAILED DESCRIPTION OF NON-LIMITING EXAMPLE EMBODIMENTS

1. Embodiment

1-1. Configuration

Figure 1:
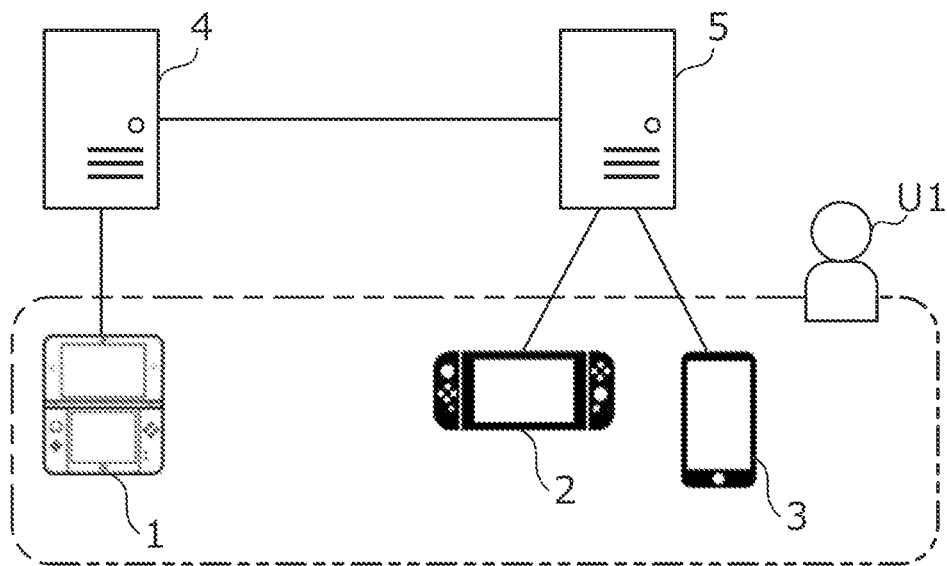
FIG. 1 is a diagram showing an example of a configuration of a character data management system.

FIG. 1 is a diagram showing an example of a configuration of a character data management system according to an embodiment of the present invention. The character data management system shown in the figure includes first game device 1, second game device 2, and smartphone 3 that are used by user U1, and first server 4 and second server 5 that are used to store character data. The devices included in the character data management system are connected by a network such as the Internet so that they can communicate with each other.

Among the devices included in the character data management system, first game device 1 can store character data in first server 4, or retrieve character data from first server 4. Second game device 2 and smartphone 3 can store character data in second server 5, or retrieve character data from second server 5. First server 4 can migrate character data that first server 4 has received from first game device 1 to second server 5. By using the character data management system, user U1 can store character data stored in his/her terminal device in a server, or share character data between his/her terminal devices via a server. Below, each of the devices will be described.

1-1-1. First Game Device 1

Figure 2:
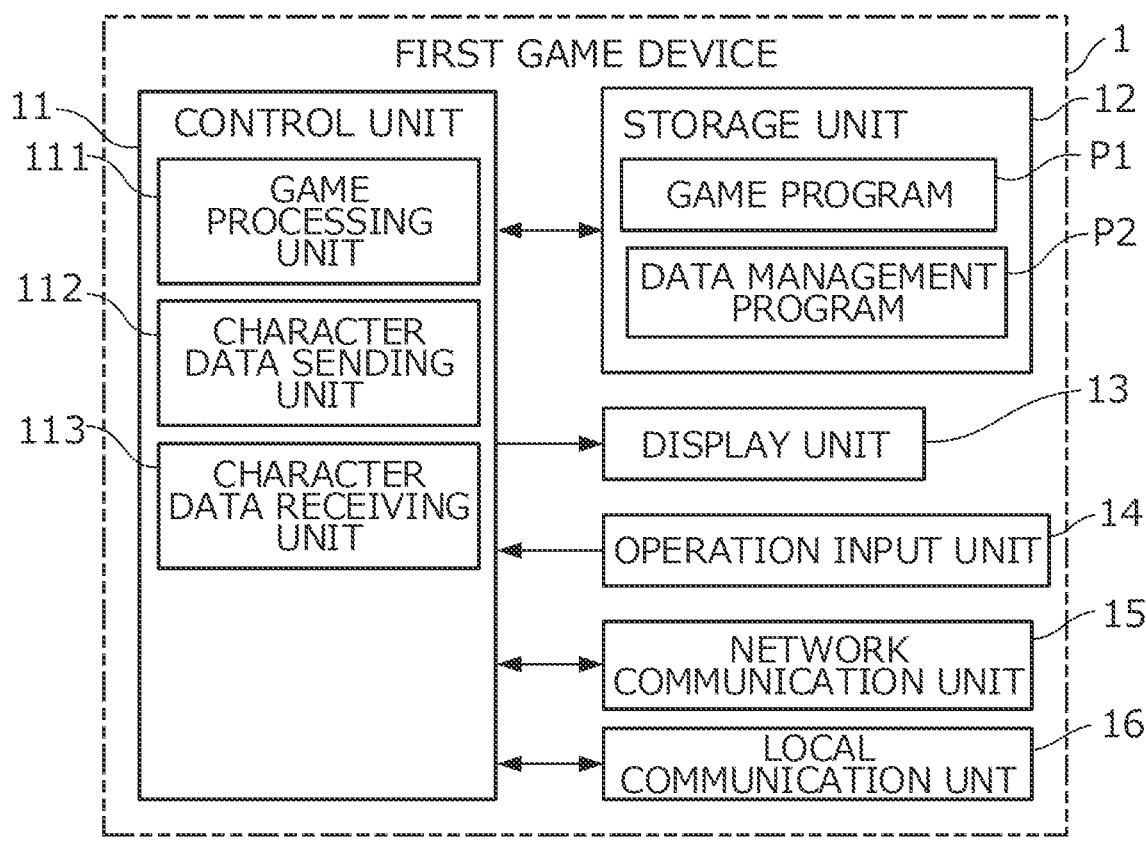
FIG. 2 is a block diagram showing an example of a configuration of first game device 1.

First game device 1 is a portable information-processing device by which a player plays a game. FIG. 2 is a block diagram showing an example of a configuration of first game device 1. First game device 1 shown in the figure includes control unit 11, storage unit 12, display unit 13, operation input unit 14, network communication unit 15, and local communication unit 16. Below, each of the components will be described.

Control unit 11 includes a processor such as a CPU or a GPU and a volatile memory. Control unit 11 executes programs stored in storage unit 12.

Storage unit 12 is a storage device such as a flash memory. Storage unit 12 stores programs that are executed by control unit 11, and include game program P1 and data management program P2. Game program P1 is a program for performing processing of game G1. Game G1 provided by game program P1 is a game in which a game player collects characters in a game space and trains them by having them battle other characters. Data management program P2 is a program for storing or retrieving character data used in game G1 in/from first server 4. These programs are programs that may be distributed via a network such as the Internet or by use of a non-transitory storage medium.

Storage unit 12 also stores data on characters that have been collected by a player of game G1. Each of character data indicates a set of parameters including a name, a level, a type, and ability values of a character, a name of a game in which the character has been acquired, a name of a user who has acquired the character, and a name of a user who possesses the character. Hereafter, such character data will be referred to as "character data D1."

Display unit 13 is a display device such as a liquid crystal display or an organic EL display.

Operation input unit 14 is an input device such as a touch sensor provided on top of display unit 13, a cross key, or an analog stick.

Network communication unit 15 is a communication module that performs Internet communication with first game device 1 (not shown) used by another user or first server 4.

Local communication unit 16 is a communication module for performing local communication with first game device 1 (not shown) used by another user. The phrase "local communication" refers to communication using a near field communication technique.

Control unit 11 described above executes game program P1 stored in storage unit 12 to provide a function of game processing unit 111. Control unit 11 also executes data management program P2 stored in storage unit 12 to provide functions of character data sending unit 112 and character data receiving unit 113. Below, each of the functions will be described.

Game processing unit 111 performs processing of game G1 to enable user U1 to play game G1. Game processing unit 111 performs the processing by use of character data D1 stored in storage unit 12.

Character data sending unit 112 sends character data D1 stored in storage unit 12 to first server 4 to store the character data in the server. Character data D1 sent to first server 4 is deleted from storage unit 12.

Character data receiving unit 113 receives character data D1 that has been retrieved from first server 4. Character data D1 received from first server 4 is stored in storage unit 12.

1-1-2. First Server 4

Figure 3:
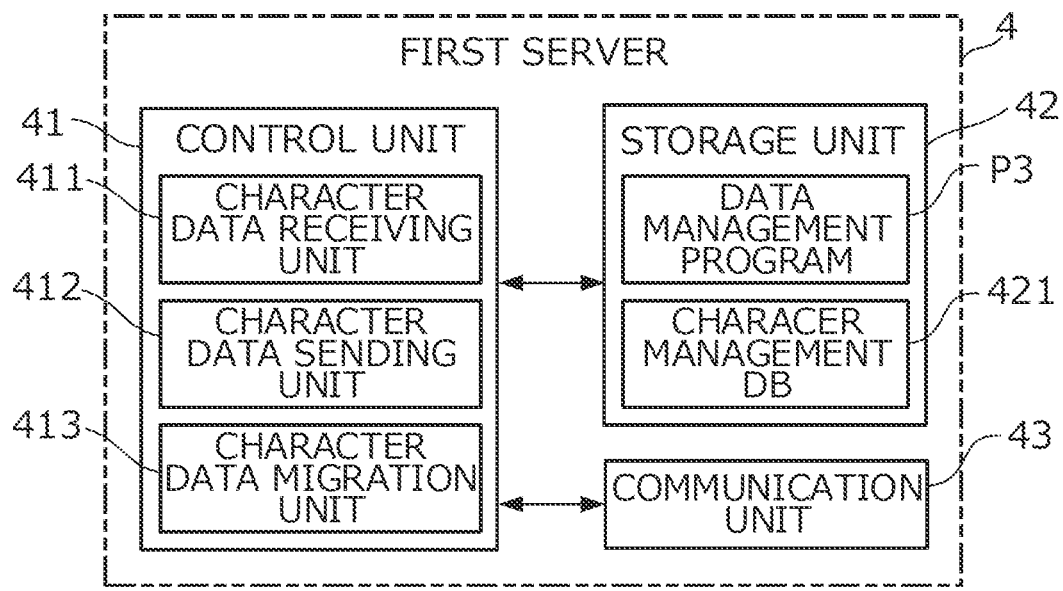
FIG. 3 is a block diagram showing an example of a configuration of first server 4.

First server 4 is an information-processing device for storing character data D1 acquired by first game device 1. FIG. 3 is a block diagram showing an example of a configuration of first server 4. First server 4 shown in the figure includes control unit 41, storage unit 42, and communication unit 43. Below, each of the components will be described.

Control unit 41 includes a processor such as a CPU or a GPU and a volatile memory. Control unit 41 executes programs stored in storage unit 42.

Storage unit 42 is a storage device such as a hard disk. Storage unit 42 stores programs that are executed by control unit 41, and include data management program P3. Data management program P3 is a program for receiving or returning character data D1 from/to first game device 1, and for migrating character data D1 that first server 4 has received from first game device 1 to second server 5. Data management program P3 is a program that may be distributed via a network such as the Internet or a non-transitory storage medium.

Storage unit 42 also stores character management DB 421 as a database for managing character data D1 that first server 4 has received from first game device 1. In character management DB 421, each item of character data D1 is stored in association with a user ID uniquely identifying user U1 who has stored the character data in first server 4, and a number of a virtual box in which the character data is stored. A virtual box can store 30 items of character data D1, and a user is provided with 100 virtual boxes, so that a user can store up to 3,000 items of character data D1 in first server 4.

Communication unit 43 is a communication module for performing Internet communication with first game device 1 or second server 5.

Control unit 41 described above executes data management program P3 stored in storage unit 42 to provide functions of character data receiving unit 411, character data sending unit 412, and character data migration unit 413. Below, each of the functions will be described.

Character data receiving unit 411 receives character data D1 sent from first game device 1 for storage. The received character data D1 is stored in character management DB 421 in association with a user ID of user U1 of first game device 1 and a box number designated by the user.

Character data sending unit 412 sends to first game device 1 character data D1 requested by first game device 1. The sent character data D1 is deleted from character management DB 421.

Character data migration unit 413 sends character data D1 stored in character management DB 421 to second server 5 for data migration. The character data D1 is sent in association with a user ID and a box number that are associated with the character data D1 in character management DB 421. The sent character data D1 is deleted from character management DB 421.

1-1-3. Second Game Device 2

Figure 4:
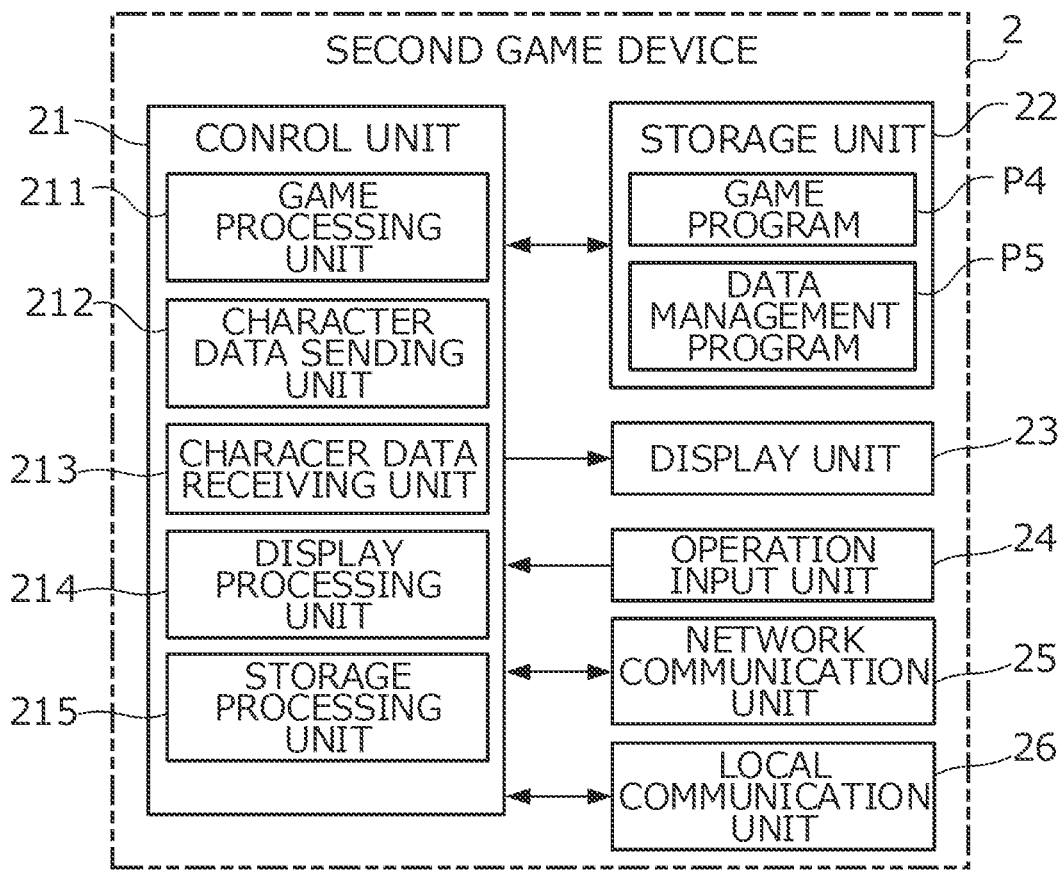
FIG. 4 is a block diagram showing an example of a configuration of second game device 2.

Second game device 2 is a portable information-processing device by which a player plays a game. Second game device 2 is a game device of a different type from first game device 1. FIG. 4 is a block diagram showing an example of a configuration of second game device 2. Second game device 2 shown in the figure includes control unit 21, storage unit 22, display unit 23, operation input unit 24, network communication unit 25, and local communication unit 26. Below, each of the components will be described.

Control unit 21 includes a processor such as a CPU or a GPU and a volatile memory. Control unit 21 executes programs stored in storage unit 22.

Storage unit 22 is a storage device such as a flash memory. Storage unit 22 stores programs to be executed by control unit 21, which include game program P4 and data management program P5. Game program P4 is a program for performing processing of game G2. Game G2 provided by game program P4 is a game in which a game player collects characters in a game space and trains them by having them battle other characters, as in the case of game G1. In game G2, character data D1 used in game G1 may be used. However, since game G2 is a game of a different type from game G1, character data D1 cannot be directly migrated from first game device 1 running game G1 to second game device 2 running game G2. Data management program P5 is a program for storing or retrieving character data used in game G2 in/from second server 5. These programs are programs that may be distributed via a network such as the Internet or by use of a non-transitory storage medium.

Storage unit 22 also stores data on characters that have been collected by a player of game G2. Character data stored in storage unit 22 include character data D1 described above and character data (hereinafter referred to as "character data D2") that is generated by adding to character data D1 a management ID uniquely identifying the character data. The management ID included in character data D2 is assigned by second server 5.

Display unit 23 is a display device such as a liquid crystal display or an organic EL display.

Operation input unit 24 is an input device such as a touch sensor provided on top of display unit 23, a cross key, or an analog stick.

Network communication unit 25 is a communication module for performing Internet communication with second game device 2 (not shown) used by another user or second server 5.

Local communication unit 26 is a communication module for performing local communication with second game device 2 (not shown) used by another user. The phrase "local communication" refers to communication using a near field communication technique.

Control unit 21 described above executes game program P4 stored in storage unit 22 to provide a function of game processing unit 211. Control unit 21 also executes data management program P5 stored in storage unit 22 to provide functions of character data sending unit 212, character data receiving unit 213, display processing unit 214, and storage processing unit 215. Below, each of the functions will be described.

Game processing unit 211 performs processing of game G2 to enable user U1 to play game G2. Game processing unit 211 performs the processing by use of character data D1 or D2 stored in storage unit 22.

Game processing unit 211 enables multi-play of game G2 with another user of second game device 2 by use of network communication unit 25 or local communication unit 26. During processing of game G2, game processing unit 211 can exchange character data D1 or D2 with the second game device 2. If game processing unit 211 has sent character data D1 or D2 to the second game device 2, game processing unit 211 deletes the sent data from storage unit 22. If game processing unit 211 has received character data D1 or D2 from the second game device 2, game processing unit 211 changes a name of a user assigned to a character in the received data to a name of user U1, and thereafter stores the data in storage unit 22.

Character data sending unit 212 sends character data D1 or D2 stored in storage unit 22 to second server 5 to store the character data in the server. The sent character data D1 or D2 is deleted from storage unit 22.

Character data receiving unit 213 requests and receives character data D2 stored in second server 5.

Display processing unit 214 causes display unit 23 to display a character selection screen in which character data D1 or D2 is selected to be stored in or retrieved from second server 5. The character selection screen includes a list of items of character data D2 received by character data receiving unit 213 (in other words, character data D2 stored in second server 5) and a list of items of character data D1 or D2 stored in storage unit 22 of second game device 2. In the former list, user U1 selects character data D2 to be retrieved from second server 5, and in the latter list, user U1 selects character data D1 or D2 to be stored in second server 5.

Storage processing unit 215 stores, in storage unit 22, character data D2 selected by user U1 as a retrieval target from among items of character data D2 received by character data receiving unit 213. When doing so, if character data D2 to be stored in storage unit 22 lacks one or more parameters (for example, some ability values) used in game G2, storage processing unit 215 automatically adds the parameters to the character data. The parameters to be added are determined based on a type of the game and a predetermined data conversion rule.

After storing character data D2 in storage unit 22, storage processing unit 215 sends a retrieval notification to second server 5 to notify the server of the retrieved character data D2. The retrieval notification includes a management ID of the retrieved character data D2, and game name information as identification information of game G2 executed in second game device 2.

1-1-4. Smartphone 3

Figure 5:
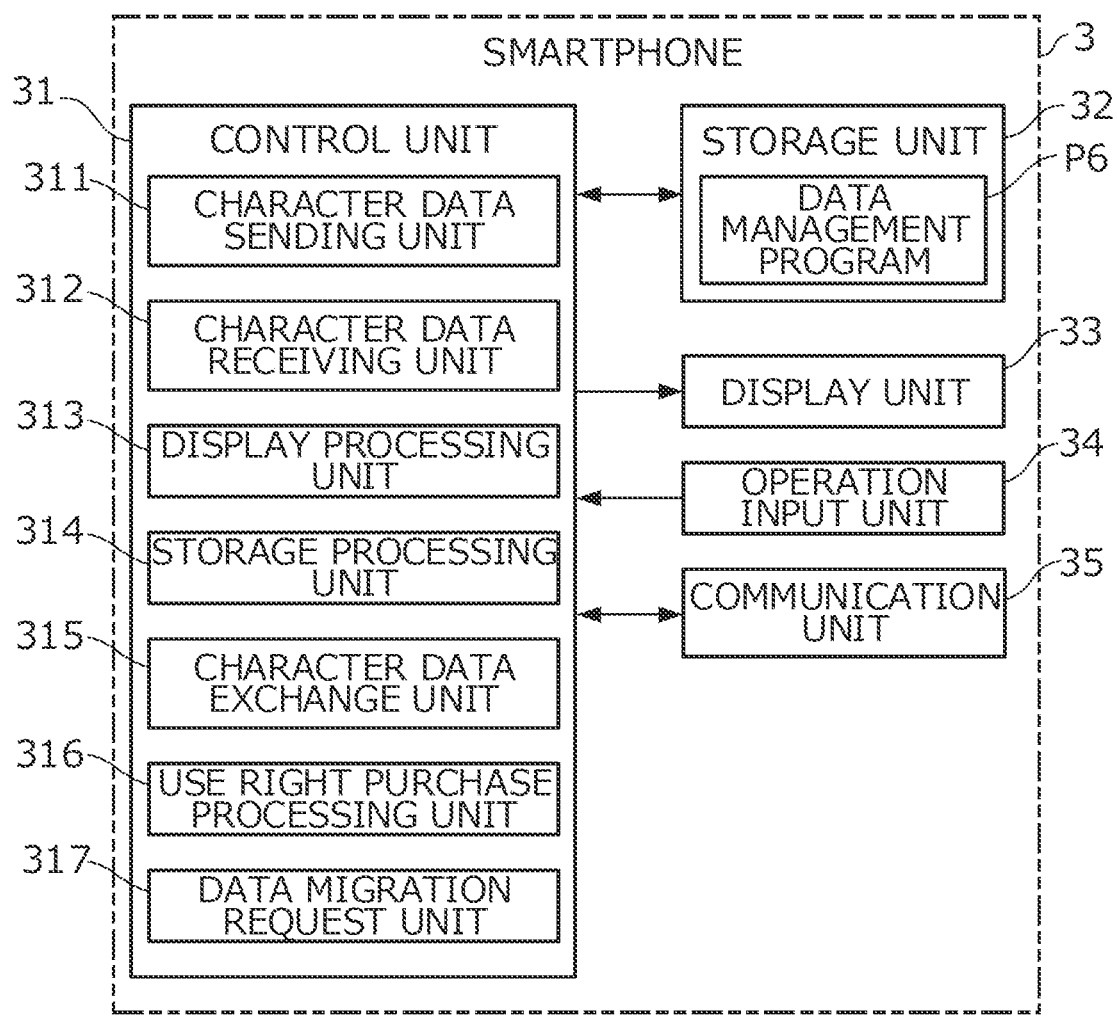
FIG. 5 is a block diagram showing an example of a configuration of smartphone 3.

Smartphone 3 is a portable information-processing device by which a player exchanges or browses character data D2 used in game G2 described above. FIG. 5 is a block diagram showing an example of a configuration of smartphone 3. Smartphone 3 shown in the figure includes control unit 31, storage unit 32, display unit 33, operation input unit 34, and communication unit 35. Below, each of the components will be described.

Control unit 31 includes a processor such as a CPU or a GPU and a volatile memory. Control unit 31 executes programs stored in storage unit 32.

Storage unit 32 is a storage device such as a flash memory. Storage unit 32 stores programs to be executed by control unit 31, which include data management program P6. Data management program P6 is a program for storing or retrieving character data D1 or D2 used in game G2 in/from second server 5, for exchanging character data D1 or D2 with smartphone 3 used by another user, and for migrating character data D1 stored in first server 4 to second server 5. Data management program P6 is a program that may be distributed via a network such as the Internet or a non-transitory storage medium.

Storage unit 32 also stores character data D1 or D2 used in game G2.

Display unit 33 is a display device such as a liquid crystal display or an organic EL display.

Operation input unit 34 is an input device such as a touch sensor provided on top of display unit 33.

Communication unit 35 is a communication module for performing Internet communication with smartphone 3 (not shown) used by another user or second server 5.

Control unit 31 described above executes data management program P6 stored in storage unit 32 to provide functions of character data sending unit 311, character data receiving unit 312, display processing unit 313, storage processing unit 314, character data exchange unit 315, use right purchase processing unit 316, and data migration request unit 317. Below, each of the functions will be described.

Character data sending unit 311 sends character data D1 or D2 stored in storage unit 32 to second server 5 to store the character data in the server. The sent character data D1 or D2 is deleted from storage unit 32.

Character data receiving unit 312 requests and receives character data D2 stored in second server 5.

Display processing unit 313 causes display unit 33 to display a character selection screen in which character data D1 or D2 is selected to be stored in or retrieved from second server 5. The character selection screen includes a list of items of character data D2 received by character data receiving unit 312 (in other words, character data D2 stored in second server 5) and a list of items of character data D1 or D2 stored in storage unit 32 of smartphone 3. In the former list, user U1 selects character data D2 to be retrieved from second server 5, and in the latter list, user U1 selects character data D1 or D2 to be stored in second server 5.

Storage processing unit 314 stores, in storage unit 32, character data D2 selected by user U1 as a retrieval target from among items of character data D2 received by character data receiving unit 312. After storing character data D2 in storage unit 32, storage processing unit 314 sends a retrieval notification to second server 5 to notify the server of the retrieved character data D2. The retrieval notification includes a management ID of the retrieved character data D2.

Character data exchange unit 315 exchanges character data D1 or D2 with smartphone 3 used by another user by use of communication unit 35. If character data exchange unit 315 has sent character data D1 or D2 to the smartphone 3, character data exchange unit 315 deletes the sent data from storage unit 32. If character data exchange unit 315 has received character data D1 or D2 from the smartphone 3, character data exchange unit 315 changes a name of a user possessing a character in the received data to a name of user U1, and thereafter stores the data in storage unit 32.

Use right purchase processing unit 316 performs processing for purchasing a right to use extended functions of the data storage service provided by second server 5. The extended functions of the data storage service include a function of increasing the number of items of character data D2 that can be stored in or retrieved from second server 5, and a function of migrating character data D1 of user U1 stored in first server 4 to second server 5. User U1 can use these functions by purchasing a right to use the extended functions. User U1 performs a predetermined operation to purchase a right to use the extended functions, in response to which use right purchase processing unit 316 sends a use purchase request to second server 5.

Data migration request unit 317, in response to a predetermined operation performed by user U1, sends to second server 5 a request to migrate character data D1 of user U1 from first server 4 to second server 5. Character data D1 to be migrated may be specified on a box basis or all at once.

1-1-5. Second Server 5

Figure 6:
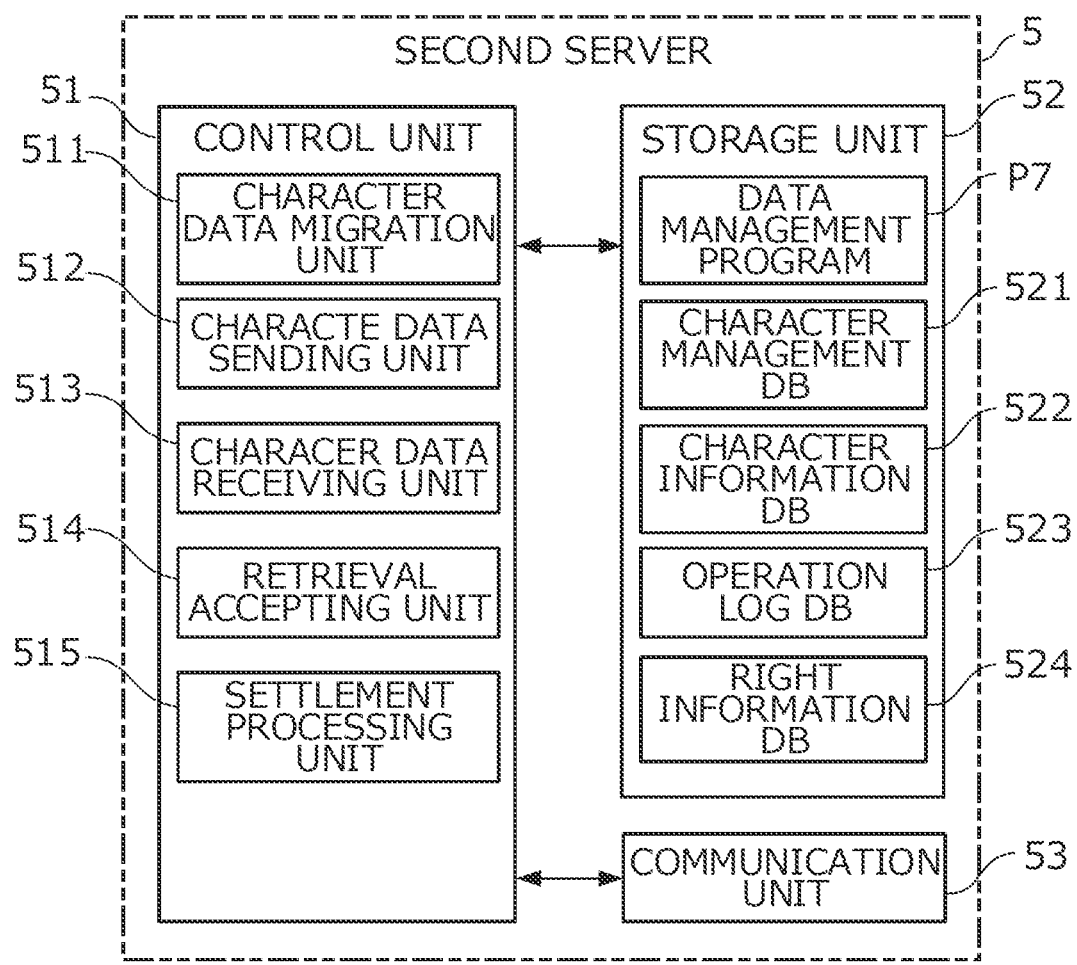
FIG. 6 is a block diagram showing an example of a configuration of second server 5.

Second server 5 is a server mainly for storing character data D2 acquired by second game device 2 or smartphone 3. FIG. 6 is a block diagram showing an example of a configuration of second server 5. Second server 5 shown in the figure includes control unit 51, storage unit 52, and communication unit 53. Below, each of the components will be described.

Control unit 51 includes a processor such as a CPU or a GPU and a volatile memory. Control unit 51 executes programs stored in storage unit 52.

Storage unit 52 is a storage device such as a hard disk. Storage unit 52 stores programs to be executed by control unit 51, which include data management program P7. Data management program P7 is a program for receiving or returning character data D1 or D2 from/to second game device 2 or smartphone 3, and for receiving character data D1 migrated from first server 4. Data management program P7 is a program that may be distributed via a network such as the Internet or a non-transitory storage medium.

Storage unit 52 also stores character management DB 521 as a database for managing character data D2 stored by user U1. In character management DB 521, a user ID of user U1 who has stored character data D2, sets of a number of a virtual box in which the character data D2 is stored, a management ID included in the character data D2, and flag information indicative of whether the character data D2 can be retrieved are stored. The flag information stored in the character management DB 521 remains set at "true (retrievable)" while the character data D2 is stored in second server 5, and remains set at "false (not retrievable)" while the character data D2 is not stored in second server 5. By referring to character management DB 521, it is possible to check which user stores which character data D2. A virtual box can store 30 items of character data D2, and a user is provided with a virtual box. A user can use 200 virtual boxes by purchasing a right to use the extended functions; namely, a user can store up to 6,000 items of character data D2.

Storage unit 52 also stores character information DB 522 as a database for managing parameters of character data D2 stored by user U1. In character information DB 522, sets of character data D2 and a parameter indicative of a name of a game in which the character data D2 is currently used are stored. The character data D2 stored in character information DB 522 is retained even after the data is retrieved by user U1 or a right of user U1 to use the extended functions expires.

Storage unit 52 also stores operation log DB 523 as a database for managing an operation log of character data D2 stored by user U1. In operation log DB 523, sets of a management ID included in character data D2, an operation performed on the character data D2, and a date and time of the operation are stored. The operation stored in operation log DB 523 includes, for example, an operation for storing the character data D2 in second server 5 or an operation for retrieving the character data D2 from second server 5.

Storage unit 52 also stores right information DB 524 as a database for managing a right of user U1 to use the extended functions. In right information DB 524, sets of a user ID of user U1 and a valid period of a right to use the extended functions are stored. By referring to right information DB 524, it is possible to check whether user U1 has a right to use the extended functions.

Now, communication unit 53 is a communication module for performing Internet communication with second game device 2, smartphone 3, or first server 4.

Control unit 51 described above executes data management program P7 stored in storage unit 52 to provide functions of character data migration unit 511, character data sending unit 512, character data receiving unit 513, retrieval accepting unit 514, and settlement processing unit 515. Below, each of the functions will be described.

Character data migration unit 511, upon accepting a data migration request sent from smartphone 3, determines whether to perform data migration. Specifically, character data migration unit 511 refers to right information DB 524 to determine whether a right of user U1 to use the extended functions is valid. As a result of the determination, in a case where the right of user U1 to use the extended functions is valid, character data migration unit 511 sends a one-time password to smartphone 3. On the other hand, in a case where the right is invalid, character data migration unit 511 sends a notification to smartphone 3 that data migration is not available.

Smartphone 3, upon receiving the one-time password, causes display unit 33 to display it. Seeing the one-time password, user U1 inputs the one-time password to first game device and sends it to first server 4. The one-time password sent to first server 4 is transferred to second server 5, and character data migration unit 511 of second server 5 matches the one-time password with the one-time password sent to smartphone 3. As a result of the matching, in a case where the two one-time passwords match, character data migration unit 511 specifies items of character data D1 to be migrated and instructs first server 4 to perform data migration. On the other hand, in a case where the two one-time passwords do not match, character data migration unit 511 notifies first server 4 of the mismatch. First server 4, upon receiving the notification, sends a notification that the input one-time password is incorrect to first game device 1, whereby first game device 1 displays the message.

First server 4, upon receiving the instruction of data migration from character data migration unit 511, sends each of the specified items of character data D1 to second server 5, in association with a corresponding user ID and box number. Character data migration unit 511 of second server 5 assigns a management ID to each of the sent items of character data D1, and stores sets of an assigned management ID, a corresponding user ID and box number, and flag information "true" in character management DB 521. Flag information "true" associated with a management ID indicates that character data D1 to which a management ID is assigned (in other words, character data D2) can be retrieved. Character data migration unit 511 also associates each of sent items of character data D1 with an assigned management ID to generate items of character data D2, and stores the generated items of character data D2 in character information DB 522. When doing so, if character data D2 to be stored in character information DB 522 lacks one or more parameters (for example, some ability values) used in game G2, character data migration unit 511 automatically adds the parameters to the character data D2. The parameters to be added are determined based on a type of the game and a pre-determined data conversion rule. Character data migration unit 511 also stores, for each of sent items of character data D1, a set of an assigned management ID, information indicating that data has been migrated from first server 4, and a date and time of the migration in operation log DB 523.

Now, character data sending unit 512, upon accepting a request from second game device 2 or smartphone 3 to send character data D2, determines a maximum number of items of character data D2 that can be sent. Specifically, character data sending unit 512 refers to right information DB 524, and in a case where a right of user U1 to use the extended functions is valid, sets a maximum number to "6000" (substantially no upper limit), and in a case where the right is invalid, sets a maximum number to "30." The maximum number is determined based on a maximum number of items of character data D2 that can be stored in second server 5. After determining a maximum number, character data sending unit 512 identifies the number of items of character data D2 stored for user U1. Specifically, character data sending unit 512 refers to character management DB 521 to identify the number of management IDs associated with a user ID of user U1 and with flag information "true." When the identified number of management IDs is equal to or less than the determined maximum number, character data sending unit 512 acquires items of character data D2 including the identified management IDs from character information DB 522 to send them to the source of the request to send character data D2. On the other hand, when the identified number of management IDs exceeds the determined maximum number, character data sending unit 512 refers to operation log DB 523 to identify 30 management IDs from among the identified management IDs in ascending order of operation date and time. Then, character data sending unit 512 acquires items of character data D2 including the identified management IDs from character information DB 522 and sends them to the source of the request to send character data D2.

Character data receiving unit 513, upon accepting character data D1 or D2 to be stored, sent from second game device 2 or smartphone 3, determines a maximum number of items of character data D2 that can be stored. Specifically, character data receiving unit 513 refers to right information DB 524, and in a case where a right of user U1 to use the extended functions is valid, sets a maximum number to "6000," and in a case where the right is invalid, sets a maximum number to "30." After determining a maximum number, character data receiving unit 513 identifies the number of items of character data D2 stored for user U1. Specifically, character data receiving unit 513 refers to character management DB 521 to identify the number of management IDs associated with a user ID of user U1 and with flag information "true." Then, character data receiving unit 513 calculates a total of the identified number of management IDs and the number of items of character data D1 or D2 to be stored, and determines whether the calculated total is equal to or less than the determined maximum number. As a result of the determination, in a case where the calculated total is equal to or less than the determined maximum number, character data receiving unit 513 determines to store the character data D1 or D2 to be stored. On the other hand, in a case where the calculated total exceeds the determined maximum number, character data receiving unit 513 sends back a message indicating that a maximum storable number is to be exceeded.

If it is determined to store the character data D1 or D2, character data receiving unit 513 assigns a management ID to character data D1, and stores a set of the assigned management ID, a user ID of user U1, a box number assigned to user U1, and flag information "true" in character management DB 521. The flag information "true" associated with the management ID indicates that the character data D1 to which the management ID is assigned (in other words, character data D2) can be retrieved. Character data receiving unit 513 also associates the character data D1 with the assigned management ID to generate character data D2, and stores the generated character data D2 in character information DB 522. Character data receiving unit 513 also stores a set of the assigned management ID, information indicating that data has been stored, and a date and time of the storage in operation log DB 523.

As for character data D2 to be stored, character data receiving unit 513 changes a user ID, a box number, and flag information "false" that are associated with a management ID of the character data D2 in character management DB 521, to a user ID of user U1, a box number assigned to user U1, and flag information "true," respectively. Character data receiving unit 513 also updates parameters associated with the management ID of the character data D2 in character information DB 522 with parameters of the character data D2. Character data receiving unit 513 also stores a set of the management ID of the character data D2, information indicating that data has been stored, and a date and time of the storage in operation log DB 523.

Retrieval accepting unit 514, upon accepting a retrieval notification sent from second game device 2 or smartphone 3, extracts a management ID from the accepted retrieval notification, and changes flag information "true" associated with extracted management ID in character management DB 521 to "false." The flag information "false" newly associated with the management ID indicates that character data D2 including the management ID cannot be retrieved. Retrieval accepting unit 514 also extracts game name information from the accepted retrieval notification, and updates game name information associated with the extracted management ID extracted in character information DB 522, with the extracted game name information. The game name information newly associated with the management ID indicates a name of a game in which character data D2 including the management ID is currently used. Retrieval accepting unit 514 also stores a set of the extracted management ID, information indicating that data has been retrieved, and a date and time of the retrieval in operation log DB 523.

Settlement processing unit 515, upon accepting a request to purchase a right to use the extended functions sent from smartphone 3, performs processing for settling payment of the purchase. On successful settlement, settlement processing unit 515 updates valid period information of user U1 stored in right information DB 524 so that the right of user U1 to use the extended functions is valid for a predetermined period.

1-2. Operation

Now, operations of the character data management system will be described. In the following, in particular, an operation in which first server 4 migrates character data D1 to second server 5, an operation in which second game device 2 stores and retrieves character data D1 or D2 in/from second server 5, and an operation in which smartphone 3 stores and retrieves character data D1 or D2 in/from second server 5 are described.

1-2-1. Operation for Data Migration

Figure 7:
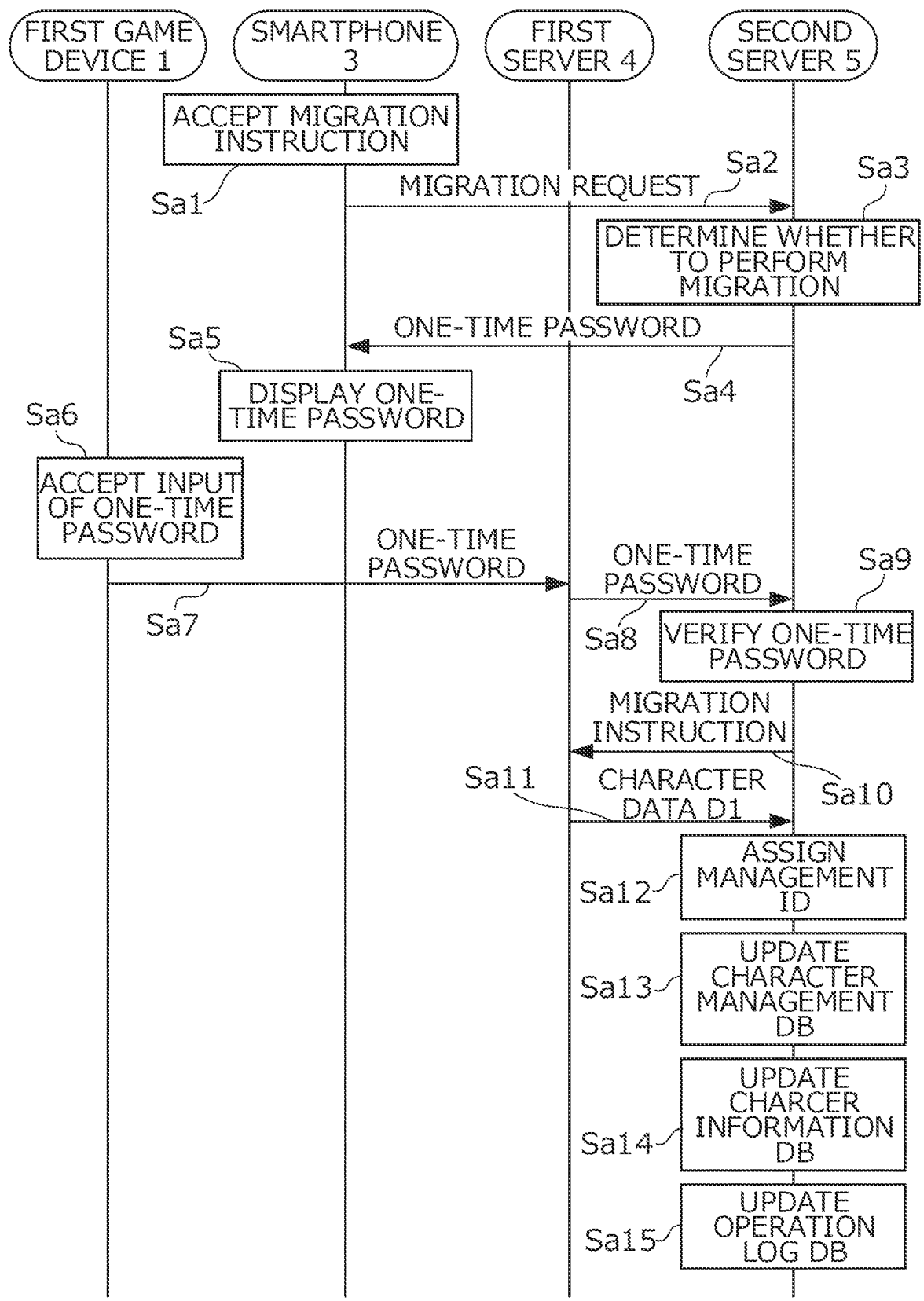
FIG. 7 is a sequence diagram showing an example of an operation in which first server 4 migrates character data D1 to second server 5.

FIG. 7 is a sequence diagram showing an example of an operation in which first server 4 migrates character data D1 to second server 5.

User U1 who wishes to transfer his/her character data D1 operates smartphone 3 to input an instruction to migrate character data D1 (step Sa1). In response to the instruction, data migration request unit 317 of smartphone 3 sends to second server 5 a request to migrate character data D1 of user U1 from first server 4 to second server 5 (step Sa2).

Character data migration unit 511 of second server 5, upon accepting the request sent from smartphone 3, determines whether to perform data migration (step Sa3). Specifically, character data migration unit 511 refers to right information DB 524 to determine whether a right to use the extended functions of user U1 is valid. As a result of the determination, in a case where the right of user U1 to use the extended functions is valid, character data migration unit 511 issues a one-time password and sends it to smartphone 3 (step Sa4). On the other hand, in a case where the right is invalid, character data migration unit 511 sends a notification to smartphone 3 that data migration is not available, which step is not shown.

Smartphone 3, upon receiving the one-time password, causes display unit 33 to display it (step Sa5). User U1 inputs the one-time password to first game device (step Sa6) and sends it to first server 4 (step Sa7). The one-time password sent to first server 4 is transferred to second server 5 (step Sa8), and character data migration unit 511 of second server 5 matches the one-time password with the one-time password sent to smartphone 3 (step Sa9). As a result of the matching, in a case where the two one-time passwords match, character data migration unit 511 specifies items of character data D1 to be migrated and instructs first server 4 to perform data migration (step Sa10). On the other hand, in a case where the two one-time passwords do not match, character data migration unit 511 notifies first server 4 of the mismatch, which step is not shown. First server 4, upon receiving the notification, sends a notification that the input one-time password is incorrect to first game device 1, whereby first game device 1 displays the message, which step is not shown.

Character data migration unit 413 of first server 4, upon accepting the instruction of data migration from character data migration unit 511, sends each of the specified items of character data D1 to second server 5, in association with a corresponding user ID and box number (step Sa11). Character data migration unit 511 of second server 5 assigns a management ID to each of the sent items of character data D1 (step Sa12), and stores sets of an assigned management ID, a corresponding user ID and box number, and flag information "true" in character management DB 521 (step Sa13). Flag information "true" associated with a management ID indicates that character data D1 to which a management ID is assigned (in other words, character data D2) can be retrieved. Character data migration unit 511 also associates each of sent items of character data D1 with an assigned management ID to generate items of character data D2, and stores the generated items of character data D2 in character information DB 522 (step Sa14). When doing so, if character data D2 to be stored in character information DB 522 lacks one or more parameters (for example, some ability values) used in game G2, character data migration unit 511 automatically adds the parameters to the character data D2. The parameters to be added are determined based on a type of the game and a pre-determined data conversion rule. Character data migration unit 511 also stores, for each of sent items of character data D1, a set of an assigned management ID, information indicating that data has been migrated from first server 4, and a date and time of the migration in operation log DB 523 (step Sa15).

The foregoing is a description of the operation for data migration.

1-2-2. Operation in Which Second Game Device 2 Stores and Retrieves Data

Figure 8:
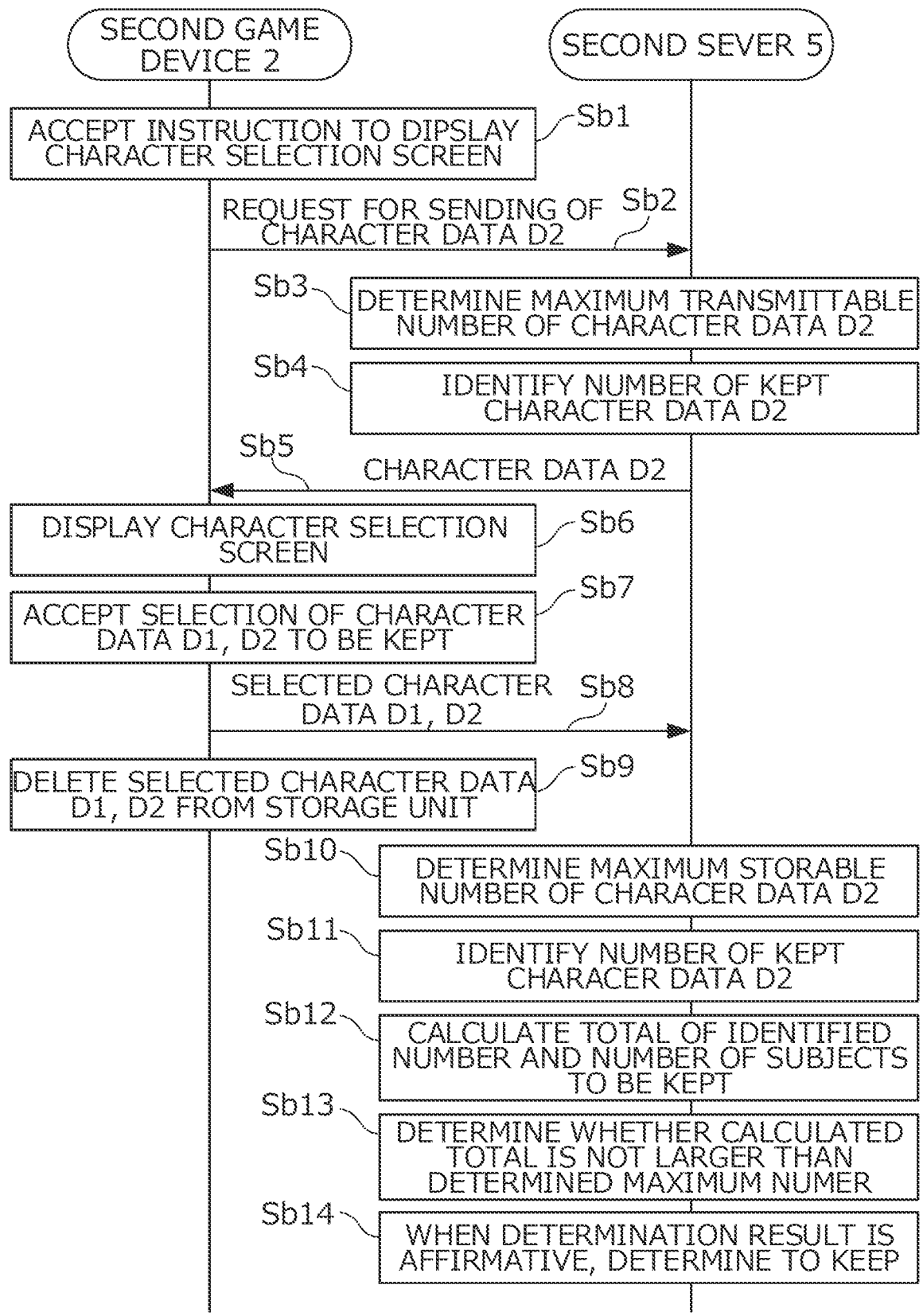
FIG. 8 is a sequence diagram showing an example of an operation in which second game device 2 stores and retrieves character data D1 or D2 in/from second server 5.
Figure 9:
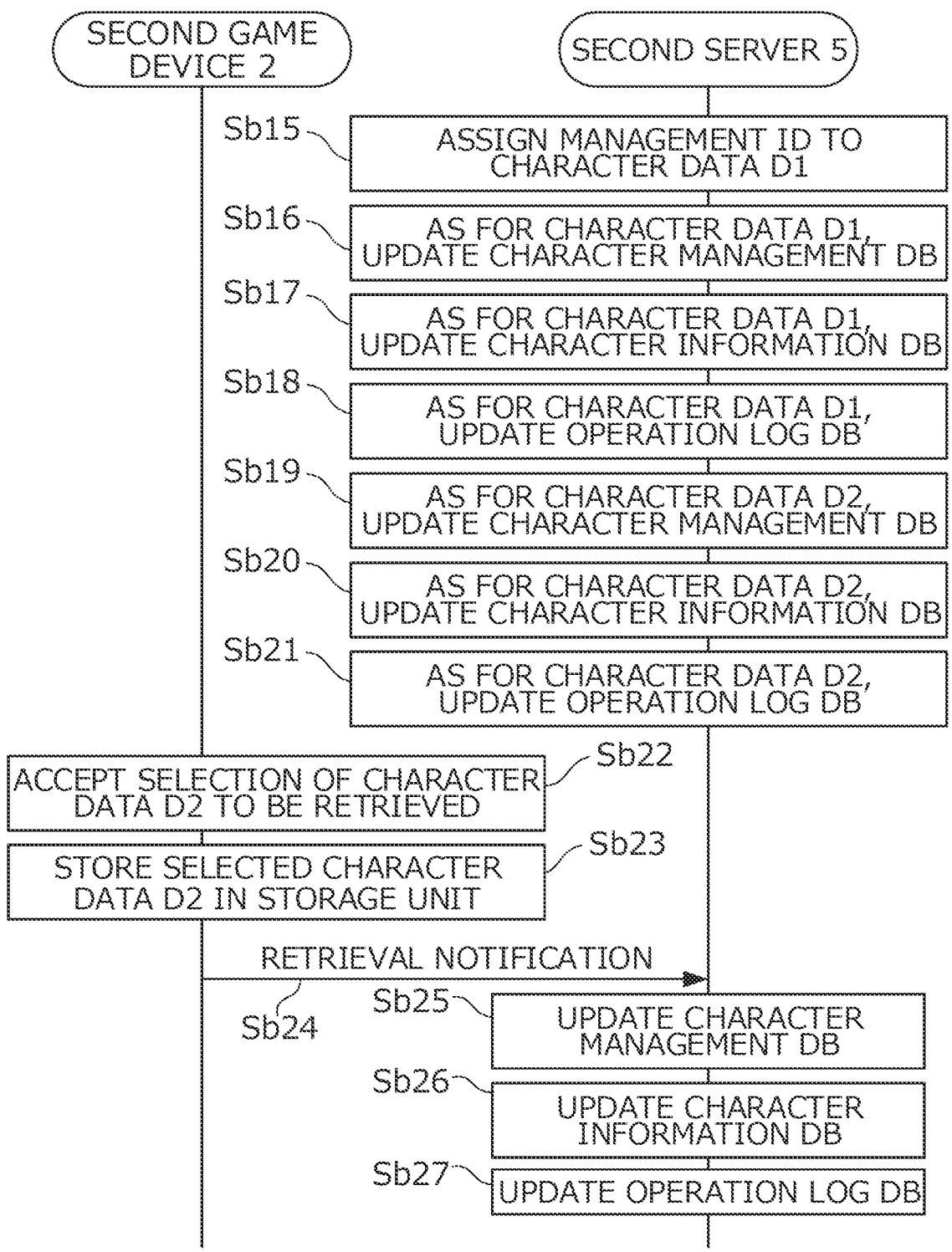
FIG. 9 is a sequence diagram showing an example of an operation in which second game device 2 stores and retrieves character data D1 or D2 in/from second server 5.

FIGS. 8 and 9 are sequence diagrams showing an example of an operation in which second game device 2 stores and retrieves character data D1 or D2 in/from second server 5.

User U1 who wishes to store and retrieve his/her character data D1 or D2 operates second game device 2 to input an instruction to display a character selection screen (step Sb1). In response to the instruction, character data receiving unit 213 of second game device 2 sends a request to second server 5 to send character data D2 stored therein (step Sb2).

Character data sending unit 512 of second server 5, upon accepting the request sent from second game device 2, determines a maximum number of items of character data D2 that can be sent (step Sb3). Specifically, character data sending unit 512 refers to right information DB 524, and in a case where a right of user U1 to use the extended functions is valid, sets a maximum number to "6000" (substantially no upper limit), and in a case where the right is invalid, sets a maximum number to "30." After determining a maximum number, character data sending unit 512 identifies the number of items of character data D2 stored for user U1 (step Sb4). Specifically, character data sending unit 512 refers to character management DB 521 to identify the number of management IDs associated with a user ID of user U1 and with flag information "true." When the identified number of management IDs is equal to or less than the determined maximum number, character data sending unit 512 acquires items of character data D2 including the identified management IDs from character information DB 522 and sends them to second game device 2 (step Sb5). On the other hand, when the identified number of management IDs exceeds the determined maximum number, character data sending unit 512 refers to operation log DB 523 to identify 30 management IDs from among the identified management IDs in ascending order of operation date and time, which step is not shown. Then, character data sending unit 512 acquires items of character data D2 including the identified management IDs from character information DB 522 and sends them to second game device 2 (step Sb5).

Display processing unit 214 of second game device 2, upon acquiring the items of character data D2 sent from second server 5, causes display unit 23 to display a character selection screen (step Sb6). The character selection screen includes a list of the items of character data D2 stored in second server 5 and a list of items of character data D1 or D2 stored in storage unit 22 of second game device 2. In the latter list, if user U1 selects character data D1 or D2 to be stored in second server 5 (step Sb7), character data sending unit 212 of second game device 2 sends the selected character data D1 or D2 to second server 5 (step Sb8). The character data D1 or D2 sent to second server 5 is deleted from storage unit 22 (step Sb9).

Character data receiving unit 513 of second server 5, upon accepting the character data D1 or D2 to be stored, sent from second game device 2, determines a maximum number of items of character data D2 that can be stored (step Sb10). Specifically, character data receiving unit 513 refers to right information DB 524, and in a case where a right of user U1 to use the extended functions is valid, sets a maximum number to "6000," and in a case where the right is invalid, sets a maximum number to "30." After determining a maximum number, character data receiving unit 513 identifies the number of items of character data D2 stored for user U1 (step Sb11). Specifically, character data receiving unit 513 refers to character management DB 521 to identify the number of management IDs associated with a user ID of user U1 and with flag information "true." Then, character data receiving unit 513 calculates a total of the identified number of management IDs and the number of items of character data D1 or D2 to be stored (step Sb12), and determines whether the calculated total is equal to or less than the determined maximum number (step Sb13). As a result of the determination, in a case where the calculated total is equal to or less than the determined maximum number, character data receiving unit 513 determines to store the character data D1 or D2 to be stored (step Sb14). On the other hand, in a case where the calculated total exceeds the determined maximum number, character data receiving unit 513 sends back a message indicating that a maximum storable number is to be exceeded, which step is not shown.

If it is determined to store the character data D1 or D2, character data receiving unit 513 assigns a management ID to character data D1 (step Sb15), and stores a set of the assigned management ID, a user ID of user U1, a box number assigned to user U1, and flag information "true" in character management DB 521 (step Sb16). The flag information "true" associated with the management ID indicates that the character data D1 to which the management ID is assigned (in other words, character data D2) can be retrieved. Character data receiving unit 513 also associates the character data D1 with the assigned management ID to generate character data D2, and stores the generated character data D2 in character information DB 522 (step Sb17). Character data receiving unit 513 also stores a set of the assigned management ID, information indicating that data has been stored, and a date and time of the storage in operation log DB 523 (step Sb18).

As for character data D2 to be stored, character data receiving unit 513 changes a user ID, a box number, and flag information "false" that are associated with a management ID of the character data D2 in character management DB 521, to a user ID of user U1, a box number assigned to user U1, and flag information "true," respectively (step Sb19). Character data receiving unit 513 also updates parameters associated with the management ID of the character data D2 in character information DB 522 with parameters of the character data D2 (step Sb20). Character data receiving unit 513 also stores a set of the management ID of the character data D2, information indicating that data has been stored, and a date and time of the storage in operation log DB 523 (step Sb21).

In the latter list displayed on display unit 23 of second game device 2, if user U1 selects character data D2 as data to be retrieved from second server 5 (step Sb22), storage processing unit 215 of second game device 2 stores the selected character data D2 in storage unit 22 (step Sb23). When doing so, if the character data D2 to be stored in storage unit 22 lacks one or more parameters (for example, some ability values) used in game G2, storage processing unit 215 automatically adds the parameters to the character data. The parameters to be added are determined based on a type of the game and a pre-determined data conversion rule.

After storing the character data D2 in storage unit 22, storage processing unit 215 sends a retrieval notification to second server 5 to notify the server of the retrieved character data D2 (step Sb24). The retrieval notification includes a management ID of the retrieved character data D2, and game name information of game G2 executed in second game device 2.

Retrieval accepting unit 514, upon accepting the retrieval notification sent from second game device 2, extracts the management ID from the accepted retrieval notification, and changes flag information "true" associated with extracted management ID in character management DB 521 to "false" (step Sb25). The flag information "false" newly associated with the management ID indicates that the character data D2 including the management ID cannot be retrieved. Retrieval accepting unit 514 also extracts game name information from the accepted retrieval notification, and updates game name information associated with the extracted management ID extracted in character information DB 522, with the extracted game name information (step Sb26). The game name information newly associated with the management ID indicates a name of a game in which the character data D2 including the management ID is currently used. Retrieval accepting unit 514 also stores a set of the extracted management ID, information indicating that data has been retrieved, and a date and time of the retrieval in operation log DB 523 (step Sb27).

The foregoing is a description of the operation in which second game device 2 stores and retrieves data.

1-2-3. Operation in Which Smartphone 3 Stores and Retrieves Data

Figure 10:
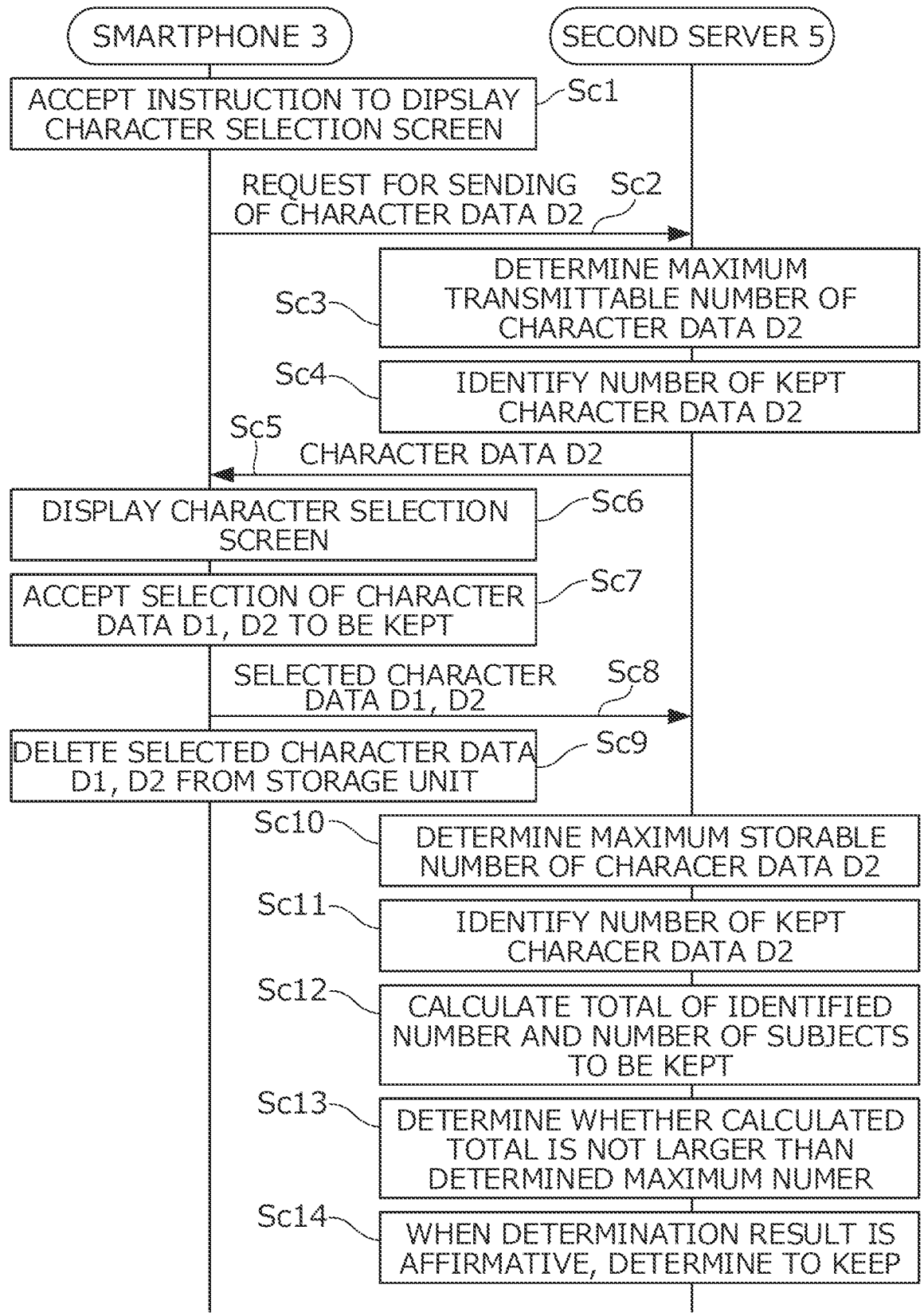
FIG. 10 is a sequence diagram showing an example of an operation in which smartphone 3 stores and retrieves character data D1 or D2 in/from second server 5.
Figure 11:
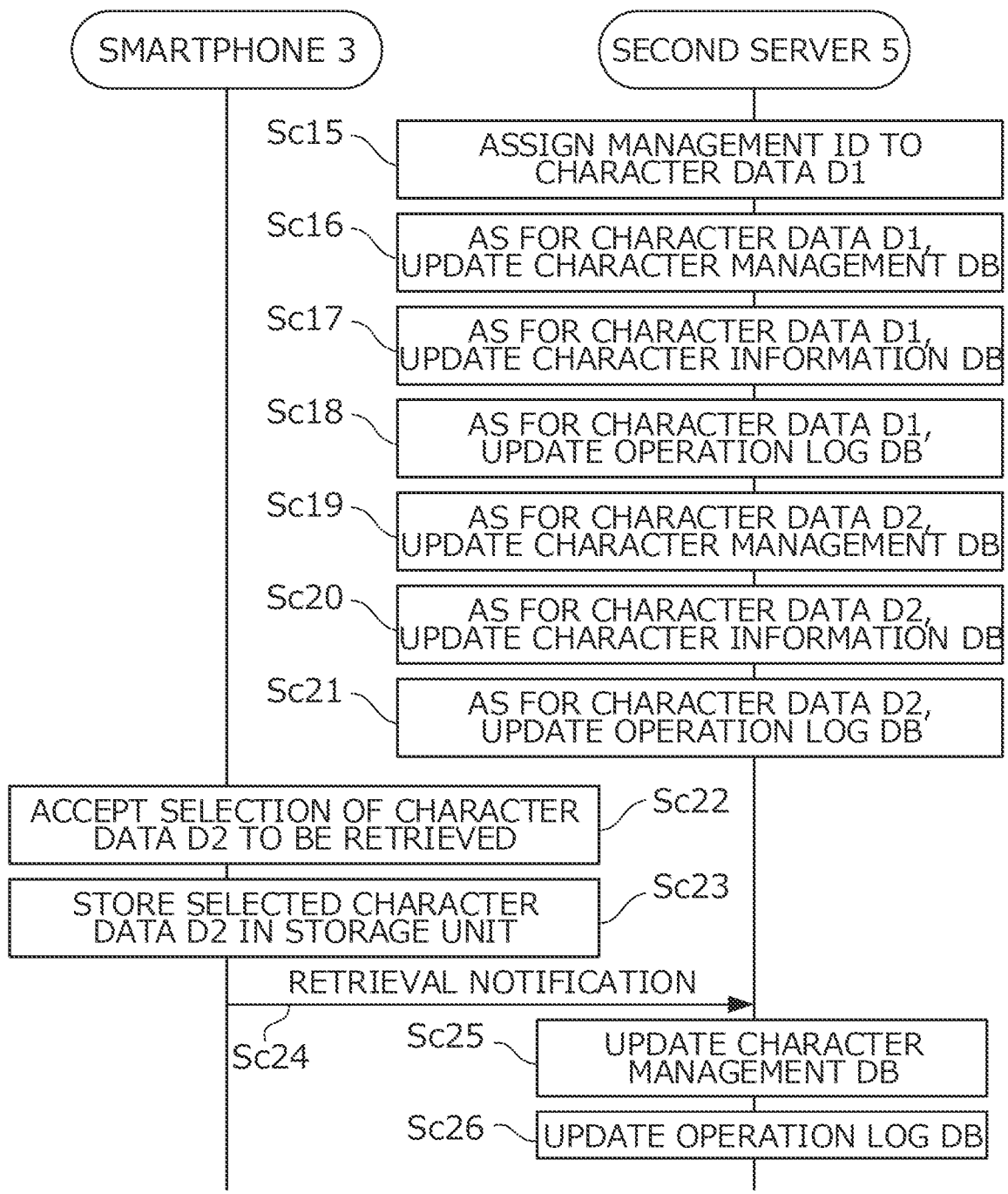
FIG. 11 is a sequence diagram showing an example of an operation in which smartphone 3 stores and retrieves character data D1 or D2 in/from second server 5.

FIGS. 10 and 11 are sequence diagrams showing an example of an operation in which smartphone 3 stores and retrieves character data D1 or D2 in/from second server 5.

User U1 who wishes to store and retrieve his/her character data D1 or D2 operates smartphone 3 to input an instruction to display a character selection screen (step Sc1). In response to the instruction, character data receiving unit 312 of smartphone 3 sends a request to second server 5 to send character data D2 stored therein (step Sc2).

Character data sending unit 512 of second server 5, upon accepting the request sent from smartphone 3, determines a maximum number of items of character data D2 that can be sent (step Sc3). Specifically, character data sending unit 512 refers to right information DB 524, and in a case where a right of user U1 to use the extended functions is valid, sets a maximum number to "6000" (substantially no upper limit), and in a case where the right is invalid, sets a maximum number to "30." After determining a maximum number, character data sending unit 512 identifies the number of items of character data D2 stored for user U1 (step Sc4). Specifically, character data sending unit 512 refers to character management DB 521 to identify the number of management IDs associated with a user ID of user U1 and with flag information "true." When the identified number of management IDs is equal to or less than the determined maximum number, character data sending unit 512 acquires items of character data D2 including the identified management IDs from character information DB 522 and sends them to smartphone 3 (step Sc5). On the other hand, when the identified number of management IDs exceeds the determined maximum number, character data sending unit 512 refers to operation log DB 523 to identify 30 management IDs from among the identified management IDs in ascending order of operation date and time, which step is not shown. Then, character data sending unit 512 acquires items of character data D2 including the identified management IDs from character information DB 522 and sends them to smartphone 3 (step Sc5).

Display processing unit 313 of smartphone 3, upon acquiring the items of character data D2 sent from second server 5, causes display unit 33 to display a character selection screen (step Sc6). The character selection screen includes a list of items of character data D2 stored in second server 5 and a list of items of character data D1 or D2 stored in storage unit 32 of smartphone 3. In the latter list, if user U1 selects character data D1 or D2 to be stored in second server 5 (step Sc7), character data sending unit 311 of smartphone 3 sends the selected character data D1 or D2 to second server 5 (step Sc8). The character data D1 or D2 sent to second server 5 is deleted from storage unit 32 (step Sc9).

Character data receiving unit 513 of second server 5, upon accepting the character data D1 or D2 to be stored, sent from smartphone 3, determines a maximum number of items of character data D2 that can be stored (step Sc10). Specifically, character data receiving unit 513 refers to right information DB 524, and in a case where a right of user U1 to use the extended functions is valid, sets a maximum number to "6000," and in a case where the right is invalid, sets a maximum number to "30." After determining a maximum number, character data receiving unit 513 identifies the number of items of character data D2 stored for user U1 (step Sc11). Specifically, character data receiving unit 513 refers to character management DB 521 to identify the number of management IDs associated with a user ID of user U1 and with flag information "true." Then, character data receiving unit 513 calculates a total of the identified number of management IDs and the number of items of character data D1 or D2 to be stored (step Sc12), and determines whether the calculated total is equal to or less than the determined maximum number (step Sc13). As a result of the determination, in a case where the calculated total is equal to or less than the determined maximum number, character data receiving unit 513 determines to store the character data D1 or D2 to be stored (step Sc14). On the other hand, in a case where the calculated total exceeds the determined maximum number, character data receiving unit 513 sends back a message indicating that a maximum storable number is to be exceeded, which step is not shown.

If it is determined to store the character data D1 or D2, character data receiving unit 513 assigns a management ID to character data D1 (step Sc15), and stores a set of the assigned management ID, a user ID of user U1, a box number assigned to user U1, and flag information "true" in character management DB 521 (step Sc16). The flag information "true" associated with the management ID indicates that the character data D1 to which the management ID is assigned (in other words, character data D2) can be retrieved. Character data receiving unit 513 also associates the character data D1 with the assigned management ID to generate character data D2, and stores the generated character data D2 in character information DB 522 (step Sc17). Character data receiving unit 513 also stores a set of the assigned management ID, information indicating that data has been stored, and a date and time of the storage in operation log DB 523 (step Sc18).

As for character data D2 to be stored, character data receiving unit 513 changes a user ID, a box number, and flag information "false" which are associated with a management ID of the character data D2 in character management DB 521, to a user ID of user U1, a box number assigned to user U1, and flag information "true," respectively (step Sc19). Character data receiving unit 513 also updates parameters associated with the management ID of the character data D2 in character information DB 522 with parameters of the character data D2 (step Sc20). Character data receiving unit 513 also stores a set of the management ID of the character data D2, information indicating that data has been stored, and a date and time of the storage in operation log DB 523 (step Sc21).

In the latter list displayed on display unit 33 of smartphone 3, if user U1 selects character data D2 as data to be retrieved from second server 5 (step Sc22), storage processing unit 314 of smartphone 3 stores the selected character data D2 in storage unit 32 (step Sc23).

After storing the character data D2 in storage unit 32, storage processing unit 314 sends a retrieval notification to second server 5 to notify the server of the retrieved character data D2 (step Sc24). The retrieval notification includes a management ID of the retrieved character data D2.

Retrieval accepting unit 514, upon accepting the retrieval notification sent from smartphone 3, extracts the management ID from the accepted retrieval notification, and changes flag information "true" associated with extracted management ID in character management DB 521 to "false" (step Sc25). The flag information "false" newly associated with the management ID indicates that the character data D2 including the management ID cannot be retrieved. Retrieval accepting unit 514 also stores a set of the extracted management ID, information indicating that data has been retrieved, and a date and time of the retrieval in operation log DB 523 (step Sc26).

The foregoing is a description of the operation in which smartphone 3 stores and retrieves data.

In second server 5 of the character data management system, character data D1 is assigned a management ID to generate character data D2, and the character data D2 is managed. The character data D2 (especially, the management ID) is retained in second server 5 even after the character data D2 is retrieved by user U1. Accordingly, when the character data D2 is again stored in second server 5, whose parameters have changed, it can be determined in second server 5 that the character data D2 has been stored in the past.

In the character data management system, it is determined, based on whether user U1 has a right to use the extended functions, whether to migrate character data D1 from first server 4 to second server 5, and how many items of character data D2 can be stored in or retrieved from second server 5. The right to use the extended functions is charged, and only users who have purchased the right can migrate character data D1 from first server 4 to second server 5, and increase the number of items of character data D2 that can be stored in or retrieved from second server 5. Accordingly, in the character data management system, an amount of communication used for exchanging character data D1 or D2 is reduced as compared with a case where use of the extended functions is not restricted.

2. Modifications

The above embodiment may be modified as described below. Two or more of the following modifications may be combined with each other.

2-1. Modification 1

In the above embodiment, only user U1 appears as a user of the character data management system, for ease of explanation; however, the system may be used by plural users.

2-2. Modification 2

First game device 1 and second game device 2 are not necessarily limited to a dedicated game machine, and may be another information-processing device capable of performing game processing, such as a smartphone, a tablet device, or a PC.

2-3. Modification 3

Smartphone 3 is merely an example of a communication device, and the functions of smartphone 3 may be provided in another communication device such as a mobile phone, a tablet device, or a PC.

2-4. Modification 4

Each of first server 4 and second server 5 may include networked servers.

2-5. Modification 5

Game program P1 and data management program P2 stored in first game device 1 are not necessarily separate programs, and may be combined into one program. The same applies to game program P4 and data management program P5 stored in second game device 2.

2-6. Modification 6

In first server 4, a virtual box can store 30 items of character data D1; however, the number "30" is merely an example. The virtual box may store any number of items of character data D1. In first server 4, a user is provided with 100 virtual boxes; however, the number "100" is merely an example. The user may be provided with any number of virtual boxes.

2-7. Modification 7

In second server 5, a virtual box can store 30 items of character data D2; however, the number "30" is merely an example. The virtual box may store any number of items of character data D2. In second server 5, a user not having a right to use the extended functions is provided with a virtual box, and a user having the right is provided with 200 virtual boxes; however, the numbers "1" and "200" are merely examples. Each of the users may be provided with any number of virtual boxes as long as a user having the right is provided with a larger number of virtual boxes than a user not having the right.

2-8. Modification 8

In a case where a right of user U1 to use the extended functions is invalid, character data migration unit 511 of second server 5, instead of completely prohibiting migration of character data D1 from first server 4 to second server 5, may allow migration of character data D1 one item at a time. By limiting the number of items of character data D1 that can be migrated simultaneously to one, a significant increase in an amount of communication is avoided.

2-9. Modification 9

Character data sending unit 512 of second server 5, when determining whether character data D2 stored therein may be retrieved, may refer to, instead of flag information stored in character management DB 521, data on operations and their date and time stored in operation log DB 523. For example, character data sending unit 512, upon finding that information indicative of data storage is associated with a newer date than information indicative of data retrieval, may determine that the character data D2 may be retrieved, and upon finding that information indicative of data retrieval is associated with a newer date than information indicative of data storage, may determine that the character data D2 may not be retrieved.

2-10. Modification 10

In a case where the number of items of character data D2 stored for user U1 exceeds a maximum transmittable number, character data sending unit 512 of second server 5, instead of sending 30 items of character data D2 in ascending order of operation date and time, may send items of character data D2 stored in a predetermined virtual box (for example, a first virtual box) of user U1.

2-11 Modification 11

When character data D2 has been retrieved by user U1, retrieval accepting unit 514 of second server 5 may delete the character data D2 stored in character information DB 522. Even if the character data D2 is deleted from character information DB 522, it can be determined based on a management ID of the data retained in character management DB 521 whether the character data D2 has been stored in the past.

2-12 Modification 12

Game G1 played on first game device 1 and game G2 played on second game device 2 are examples of a game in which character data D1 or D2 can be used. Character data D1 or D2 may be used in a game of a genre different from that of games G1 and G2.

2-13 Modification 13

Character data D1 and D2 managed in the character data management system are examples of content data that can be managed in the system. Instead of character data D1 and D2, data on items used in a game may be managed in the character data management system.

What is claimed is:

1. A content data holding system, comprising:
a server; and
at least one information-processing device configured to communicate with the server, wherein
the server comprises:
   a content storage medium configured to store content data of content usable in different types of games; and
   a processor configured to execute a management program of the content data, and the information-processing device is configured to:
   store the content data; and
   perform at least one of transmission and reception of the content data to/from the server, wherein
   the content storage medium is configured to store at least one parameter used when the content is used in the games as the content data for each content, and
the management program, when executed, causes the processor to:
   in a case that the received content data lacks at least one of the parameter, automatically add the parameter to the received content data, and store the received content data in the content storage medium;
   upon a transmission request, send the content data to the information-processing device, and retain the sent content data in the content storage medium, wherein sending the content data again is prohibited; and
   when the content data is sent from the information-processing device, receive the content data, and store the received content data in the content storage medium, wherein sending the content data is allowed.

2. The content data holding system according to claim 1, wherein
the management program further causes the processor to:
   set the sent content data to a state in which sending the content data again is prohibited, while the parameter of the sent content data is retained in the content storage medium.

3. The content data holding system according to claim 2, wherein
the information-processing device is further configured to perform game processing of one of the games by using the content data stored in the information-processing device; and
the management program further causes the processor to, upon sending the content data to the information-processing device, store game identification information that identifies one of the games played in the information-processing device, in the content storage medium.

4. The content data holding system according to claim 1, wherein the information-processing device is further configured to:
   perform game processing of one of the games by use of the content data stored in the information-processing device; and
   during the game processing, exchange the content data with another information-processing device.

5. The content data holding system according to claim 1, wherein
the parameter includes user name information used in the games,
the information-processing device is further configured to:
   perform game processing of one of the games by use of the content data stored in the information-processing device; and
   during the game processing, change the user name information to a user name used in the one of the games, and
the management program further causes the processor to store the user name information of the received content in the content storage medium.

6. The content data holding system according to claim 1, wherein
the server further comprises a management information storage medium configured to store valid period information of a right to use an extended function concerning the content data, and
the management program further causes the processor to:
   determine whether the right is valid based on the valid period information;
   in a case that the right is invalid, receive the content data from the information-processing device, and store, up to a first upper number, the received content data in the content storage medium such that the received content data can be sent;
   in a case that the right is valid, receive the content data from the information-processing device, and store, up to a second upper number larger than the first upper number, the received content data in the content storage medium such that the received content data can be sent; and
   retain the content data stored in the content storage medium such that the content data cannot be sent again, regardless of the first or second upper number.

7. The content data holding system according to claim 6, wherein
the information-processing device is further configured to perform use right purchase instruction processing for purchasing the right; and
the management program further causes the processor to perform settlement processing in response to the use right purchase instruction processing, and update the valid period information so that the right is valid for a predetermined period.

8. The content data holding system according to claim 1, wherein the parameter is added based on a type of game and a predetermined data conversion rule.

9. A non-transitory computer readable storage medium having stored therein a data management program executable by one or more processors of a server, wherein the server is configured to communicate with at least one information-processing device, and the server includes a content storage medium configured to store content data of content usable in different types of games, wherein the information-processing device is configured to store the content data, and perform at least one of transmission and reception of the content data to/from the server, the content storage medium is configured to store at least one parameter used when the content is used in the games as the content data for each content, and the data management program, when executed, causes the one or more processors to provide execution comprising:
  in a case that the received content data lacks at least one of the parameter, automatically adding the parameter to the received content data, and storing the received content data in the content storage medium;
  upon a transmission request, sending the content data to the information-processing device, and retaining the sent content data in the content storage medium, wherein sending the content data again is prohibited; and
  when the content data is sent from the information-processing device, receiving the content data, and storing the received content data in the content storage medium, wherein sending the content data is allowed.

10. The non-transitory computer readable storage medium according to claim 9, wherein the parameter is added based on a type of game and a predetermined data conversion rule.

11. A data management method performed in a server configured to communicate with at least one information-processing device, wherein the server includes a content storage medium configured to store content data of content usable in different types of games, the information-processing device is configured to store the content data, and perform at least one of transmission and reception of the content data to/from the server, and the content storage medium is configured to store at least one parameter used when the content is used in the games as the content data for each content, the data management method comprising:
  in a case that the received content data lacks at least one of the parameter, automatically adding the parameter to the received content data, and storing the received content data in the content storage medium;
  upon a transmission request, sending the content data to the information-processing device, and retaining the sent content data in the content storage medium, wherein sending the content data again is prohibited; and
  when the content data is sent from the information-processing device, receiving the content data, and storing the received content data in the content storage medium, wherein sending the content data is allowed.

12. The method according to claim 11, wherein the parameter is added based on a type of game and a predetermined data conversion rule.

13. A content data holding server configured to communicate with at least one information-processing device to send and/or receive content data of content usable in different types of games, the content data holding server comprising:
  a content storage medium configured to store the content data; and
  a processor configured to execute a management program of the content data, wherein
  the content storage medium is configured to store at least one parameter used when the content is used in the games as the content data for each content, and
  the management program, when executed, causes the processor to:
    in a case that the received content data lacks at least one of the parameter, automatically add the parameter to the received content data, and store the received content data in the content storage medium;
    upon a transmission request, send the content data to the information-processing device, and retain the sent content data in the content storage medium, wherein sending the content data again is prohibited; and
    when the content data is sent from the information-processing device, receive the content data, and store the received content data in the content storage medium, wherein sending the content data is allowed.

14. The content data holding server according to claim 13, wherein
  the management program further causes the processor to:
    set the sent content data to a state in which sending the content data again is prohibited, while the parameter of the sent content data is retained in the content storage medium.

15. The content data holding server according to claim 14, wherein
  the information-processing device is further configured to perform game processing of one of the games by using the content data stored in the information-processing device; and
  the management program further causes the processor to, upon sending the content data to the information-processing device, store game identification information that identifies one of the games played in the information-processing device, in the content storage medium.

16. The content data holding server according to claim 13, wherein the information-processing device is further configured to:
  perform game processing of one of the games by use of the content data stored in the information-processing device; and
  during the game processing, exchange the content data with another information-processing device.

17. The content data holding server according to claim 13, wherein
  the parameter includes user name information used in the games,
  the information-processing device is further configured to:
    perform game processing of one of the games by use of the content data stored in the information-processing device; and
    during the game processing, change the user name information to a user name used in the one of the games, and
  the management program further causes the processor to store the user name information of the received content in the content storage medium.

18. The content data holding server according to claim 13, wherein
  the content data holding server further comprises a management information storage medium configured to store valid period information of a right to use an extended function concerning the content data, and
  the management program further causes the processor to:
    determine whether the right is valid based on the valid period information;
    in a case that the right is invalid, receive the content data from the information-processing device, and store, up to a first upper number, the received content data in the content storage medium such that the received content data can be sent;

in a case that the right is valid, receive the content data from the information-processing device, and store, up to a second upper number larger than the first upper number, the received content data in the content storage medium such that the received content data can be sent; and retain the content data stored in the content storage medium such that the content data cannot be sent again, regardless of the first or second upper number.

19. The content data holding server according to claim 18, wherein the information-processing device is further configured to perform use right purchase instruction processing for purchasing the right; and the management program further causes the processor to perform settlement processing in response to the use right purchase instruction processing, and update the valid period information so that the right is valid for a predetermined period.

20. The content data holding server according to claim 13, wherein the parameter is added based on a type of game and a predetermined data conversion rule.

* * * * *